Oct. 12, 1971     D. F. JANOUS     3,611,713
INTERNAL HEAT MOTOR
Filed Oct. 17, 1969
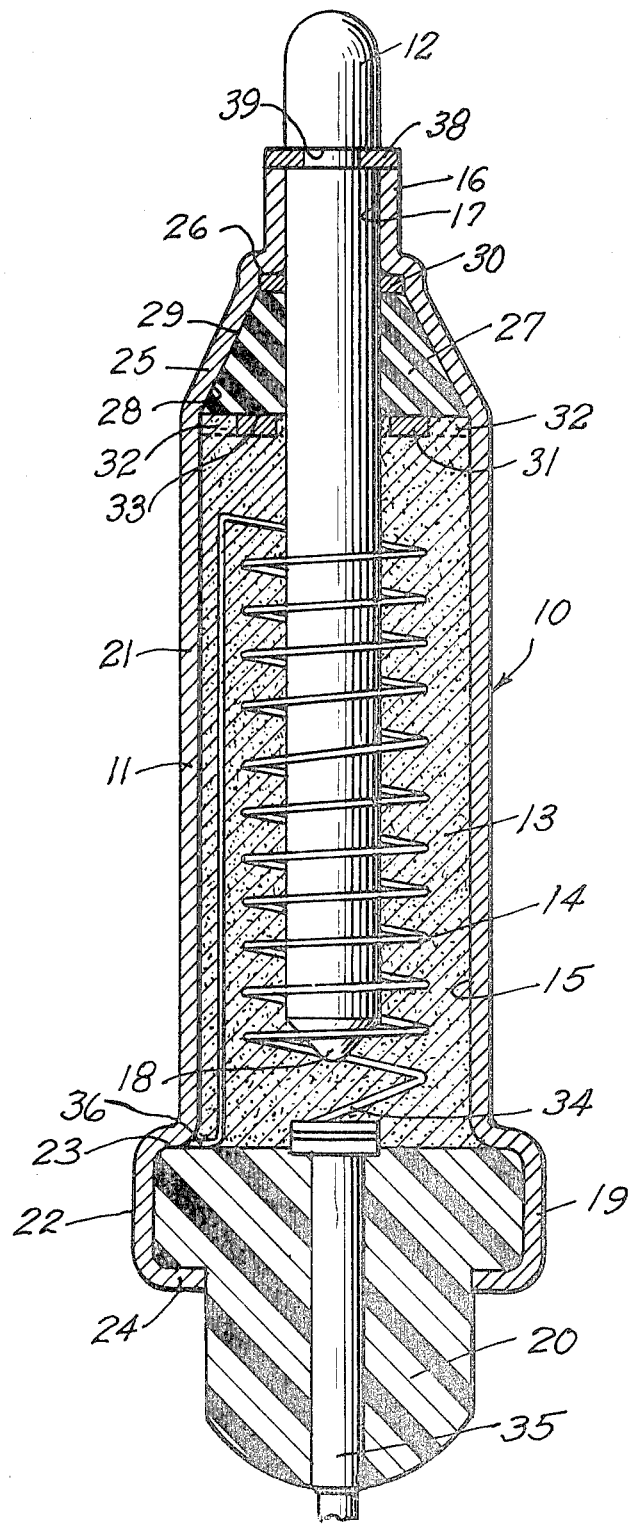
INVENTOR.
Donald F. Janous
BY    *Hill, Sherman, Meroni, Gross & Simpson*
ATTORNEYS United States Patent Office 3,611,713
Patented Oct. 12, 1971

1

3,611,713
INTERNAL HEAT MOTOR
Donald F. Janous, Chicago, Ill., assignor to Eaton Yale
& Towne, Inc., Cleveland, Ohio
Filed Oct. 17, 1969, Ser. No. 867,283
Int. Cl. F03g 7/06
U.S. Cl. 60—23                                    11 Claims

ABSTRACT OF THE DISCLOSURE

A thermal unit characterized by a piston disposed in a chamber in a housing which contains a temperature sensitive expansive material which expands at a prescribed temperature to cause movement of the piston in the housing. To prevent loss of the thermal material from the housing, a seal ring having a frusto-conical outer surface is disposed in a portion of the housing having a complementary frusto-conical surface so that pressures developed by the expanding material causes the seal ring to wedge into a tighter sealing engagement with a portion of the piston. The sealing arrangement is particularly adapted for use in a thermal motor which includes a heating coil having terminals for receiving an electrical current from a source outside of the unit to cause movement of the piston in response to an application of an electrical current.

BACKGROUND OF THE INVENTION

Field of the invention

The present invention is directed to a thermal unit and in particular to an improved means of providing a sliding seal of the piston in the unit which is preferably a heat motor.

Prior art

Thermal responsive elements having a housing containing a charge of expansible material such as wax which expands at predetermined temperatures to apply pressure to a piston are presently available. In such a device, if the material due to the temperature applied to the charge expands with an increasing pressure, problems have arisen with providing adequate seals between the piston and the housing to prevent the wax charge from leaking therebetween. The problem of providing adequate sliding seals for the piston in the housing of a thermal unit is especially noticeable in those units having a material charge in direct contact with the piston and the charge is made up of specific combinations of waxes so that portions of the charge expand at different temperatures with a progressively increasing force as the temperature increases. Such problems occur in either a thermal unit which is measuring the temperature of a fluid or a thermal heat motor. Another problem concerning seal of these units is the chafing of the seal by being forced into the guide opening of the unit during movement of the piston.

SUMMARY OF THE INVENTION

The present invention is directed to a thermal unit and particularly a motor having an improved sealing means providing a sliding seal between a housing and a piston with a seal engagement which is increased proportional to the increase in the pressure of the expansible material of the unit. In the preferred embodiment the pressure of the expansible material acts directly on the seal to wedge it into a tighter sealing engagement with the piston.

Accordingly, it is an object of the present invention to provide a thermal unit having sealing means for the piston which provide a sealing engagement proportional to the pressure exerted by the expansible material.

2

Another object of the present invention is to provide a thermal unit such as a thermal heat motor in which the seal between the piston and the unit increases and decreases the sealing forces in response to the expansion and contraction of the expansible material of the unit.

Other objects, features and advantages of the invention will be readily apparent from the following description of a preferred embodiment thereof taken in conjunction with the accompanying drawing although variations and modifications may be effected without departing from the spirit and scope of the novel concepts of this disclosure.

BRIEF DESCRIPTION OF THE DRAWING

The figure illustrates a longitudinal cross-section of a thermal element of the present invention.

DESCRIPTION OF THE PREFERRED
EMBODIMENT

Although the principles of the present invention are of utility in a thermal element requiring proportional increase sealing pressures for increased pressures created by the expansible material, they are particularly useful when incorporated in a thermal element of a thermal heat motor type and the embodiment herein shown illustrates the novel structure utilized in a thermal heat motor generally indicated at 10.

The thermal heat motor 10 is made up of a housing 11, a piston 12, a charge of temperature sensitive expansible material 13, and a heating element or coil 14. The housing 11 has a cavity or chamber 15 in which the charge of expansible material 13 and the coil 14 are disposed. At one end 16 of the housing 11, a guide opening 17 is provided and slidably receives the piston 12 as a portion of the piston terminating at an end 18 extends into the cavity or chamber 15. The other end 19 of the housing 11 receives a seal means 20.

As illustrated, the housing 11 is a tubular member having a cylindrical portion 21 terminating adjacent the end 19 in an enlarged portion 22 which forms a shoulder 23 for receiving the seal means or plug 20. The enlarged portion 22 is inwardly flanged at 24 to hold the seal member 20 in place and to complete the seal between the housing and plug. The end 16 which has the guide opening 17, is an integral portion of the housing 11 and is of a smaller diameter than the cylindrical portion 21 to which it is connected by a tapering portion 25 and a shoulder portion 26.

To provide a seal around the piston 12, a seal ring 27 surrounds the piston 12 and is disposed in the tapered portion 25 which has a frusto-conical surface 28 which is complementary to a frusto-conical surface 29 of the seal ring 27. To prevent the extrusion of the seal ring 27 into the guide opening 17, a ring such as a chafing ring 30 is located between the shoulder 26 and the seal ring 27. To retain the seal ring in the tapered portion 25, a retaining means 31, which has perforations such as 32, is provided.

When heat is applied to the material 13, an expansion of the material will occur at a predetermined temperature causing the piston to be forced out of the chamber 15 and applying a pressure through the perforation 32 to a surface 33 of the seal ring 27. With the application of the pressure to the surface 33, the seal ring 27 is forced into the frusto-conical surface 28 and wedged into a tighter sealing engagement with the piston 12. The wedging of the seal ring 27 is proportional to the amount of pressure applied to the surface 33 and the increase in the sealing engagement between the seal ring and the piston 12 increases in a direct proportion to the increase in the pressure created by the expansible material 13.

As described and without the heating coil 14, the unit 10 would be considered a thermal element which is heated by the ambient temperature of the fluids contacting the housing 11. The expansible material 13 can be selected of various wax compositions which produce a predetermined amount of expansion at a predetermined temperature. If the expansible material 13 is a mixture of various waxes having various thermal properties, the expansible material 13 may display expansion of a predetermined amount at different predetermined temperatures. In other words, by the proper selection of the wax material, which waxes are well-known in the art, it is possible to get axial movement of the piston 12 by the expansion of the material 13 at a predetermined first temperature followed by subsequent additional axial movement at a predetermined higher temperature. Thus, the movement of the piston 12 can be a step movement which is very advantageous in certain applications. With a drop of the ambient temperature, the wax charges will contract and the piston 12 will return to the position shown. The end 18 of the piston 12 has a conical point to facilitate the return of the piston into the chamber.

By providing a heating coil 14 which is coated with an insulative material such as a lacquer, and is connected at one end 34 to a terminal 35 extending through the seal means 20 which is of an insulative material such as glass reinforced nylon, and by having its other end electrically connected to the housing 11, a control current can be passed through the coil 14 to cause the material 13 to expand to move the piston 12. The addition of the coil 14 makes the thermal unit a heat responsive motor type thermal unit.

To prevent the piston 12 from moving into the chamber 15 to such an extent as to damage the coil 14 or the connection to the terminal 35, a retaining means such as a snap ring 38 disposed in a groove 39 is provided which retaining ring abuts against the one end 16 of the housing 11.

With the heating coil 14, the thermal responsive motor 10 will produce axial movement of the piston 12 in response to an outside current passing through the terminal 35 and the housing 11 to the coil 14. If the thermal expansive material 13 is selected of a predetermined mixture of wax charges, a step axial movement of the piston 12 can be obtained so that a certain amount of movement is obtained at one temperature created by a certain current flow followed by a second amount of movement at a second predetermined temperature caused by a greater current flow.

As in the description of an operation of the unit 10 as a thermal unit, the increase in the pressure of the expansible material 13 acts on the surface 32 of the seal ring 27 to cause a wedging of the seal ring in the frusto-conical surface 28 to increase the sealing engagement between the ring 27 and the piston in proportion to the increase in pressure developed in the chamber 15. Such an arrangement has the advantage of preventing leaking of the thermal responsive material about the piston while overcoming the disadvantage of the drag created by an excessive amount of sealing forces when the pressure in the chamber 15 is at a low magnitude. Thus, the frictional drag of the seal 27 is directly proportional to the amount of pressure developed by the thermal responsive material in the chamber 15 and enables the piston 12 to move in response to changes of condition of the expansible material without the detriment of the lag imposed by the frictional forces developed by the high sealing pressures necessary at the high pressures developed in the chamber 15.

I claim as my invention:

1. A thermal element comprising:
a housing having a cavity defining a chamber containing a temperature sensitive expansible material, said housing having a guide opening in communication with one end of said chamber and said chamber having a frusto-conical surface adjacent said one end converging toward said guide opening;
a piston member slidably disposed in said guide opening and having an end extending into said chamber said end of said piston member having a shape so that expansion of said material causes the relative movement of the piston member in the guide opening; and
a sealing ring disposed in said chamber at said one end in contact with said frusto-conical surface and in sealing engagement with a portion of said piston member so that as the temperature sensitive expansible material expands causing the relative movement between the housing and the piston member, the material acts against the sealing ring to wedge the seal ring against the frusto-conical surface to increase the sealing engagement between the ring and the piston member.

2. A thermal element according to claim 1 wherein said sealing ring has a frusto-conical surface complementary to the surface of said housing.

3. A thermal element according to claim 1, which includes a lock retainer means disposed in said chamber to hold said seal ring in contact with said frusto-conical surface and to prevent movement of said seal ring away from said conical surface as the piston moves into said housing, said retainer means having perforations to enable the material to act on said ring.

4. A thermal element according to claim 1 which includes a heating means disposed in said chamber to heat said expansible material in response to a signal so that the thermal element is a thermal heat motor.

5. A thermal element according to claim 4 in which the other end of said chamber is closed by an insulated bottom seal supporting a terminal for said heating element, and wherein said heating element has one end connected to said terminal and the other end connected to a wall of said housing.

6. A thermal element according to claim 1, wherein said piston has means engageable with said housing to limit the movement of said piston into said housing.

7. A thermal element according to claim 1, which includes means disposed between said seal ring and said one end to prevent extrusion of said seal ring into said guide opening.

8. A thermal heat motor comprising:
a housing having a cavity defining a chamber containing a thermal sensitive expansible material, said housing having a guide opening disposed at one end in communication with said chamber, and said chamber having a frusto-conical surface adjacent said one end converging toward said guide opening;
a piston member slidably disposed in said guide opening and having an end extending into said chamber, said end being shaped so that expansion of said material forces said end of said piston toward said guide opening to cause relative movement between said housing and said piston;
heating means disposed in said chamber and having terminals for receiving an electrical current from a source outside of said housing; and
a sealing ring disposed in said housing in contact with said frusto-conical surface and in sealing engagement with a portion of said piston so that an application of current to the heating means causes the expansible material to move the piston in said guide means and to directly apply a force to said seal ring causing wedging of the seal ring into tighter sealing engagement with a portion of the piston.

9. A thermal heat motor according to claim 8, wherein the other end of said housing is closed by a seal member of insulative material which supports one of the terminals for said heating means, the other terminal being formed by a portion of said housing.

10. A thermal heat motor according to claim 8 wherein said sealing ring has a frusto-conical surface complementary to the frusto-conical surface of said housing and which includes a retainer means disposed in the housing to hold said seal ring in engagement with the frusto-conical surface of said housing, said retainer means having perforations to enable the material to act directly on said sealing ring.

11. A thermal heat motor according to claim 8, wherein means are applied between said frusto-conical surface of said housing and said guide opening to prevent extrusion of said seal ring into said guide opening as pressure is applied by the expansible material.

References Cited

UNITED STATES PATENTS

| | | | |
|---|---|---|---|
| 2,368,181 | 1/1945 | Vernet | 60—23 |
| 3,131,269 | 4/1964 | Asakawa | 60—23 X |
| 3,300,134 | 1/1967 | Wahler | 236—100 X |

MARTIN P. SCHWADRON, Primary Examiner

A. M. OSTRAGER, Assistant Examiner